INVENTORS.
MARTIN H. PANNING
BRUCE R. CURRY
BY Mann, Brown & McWilliams
Attorneys.

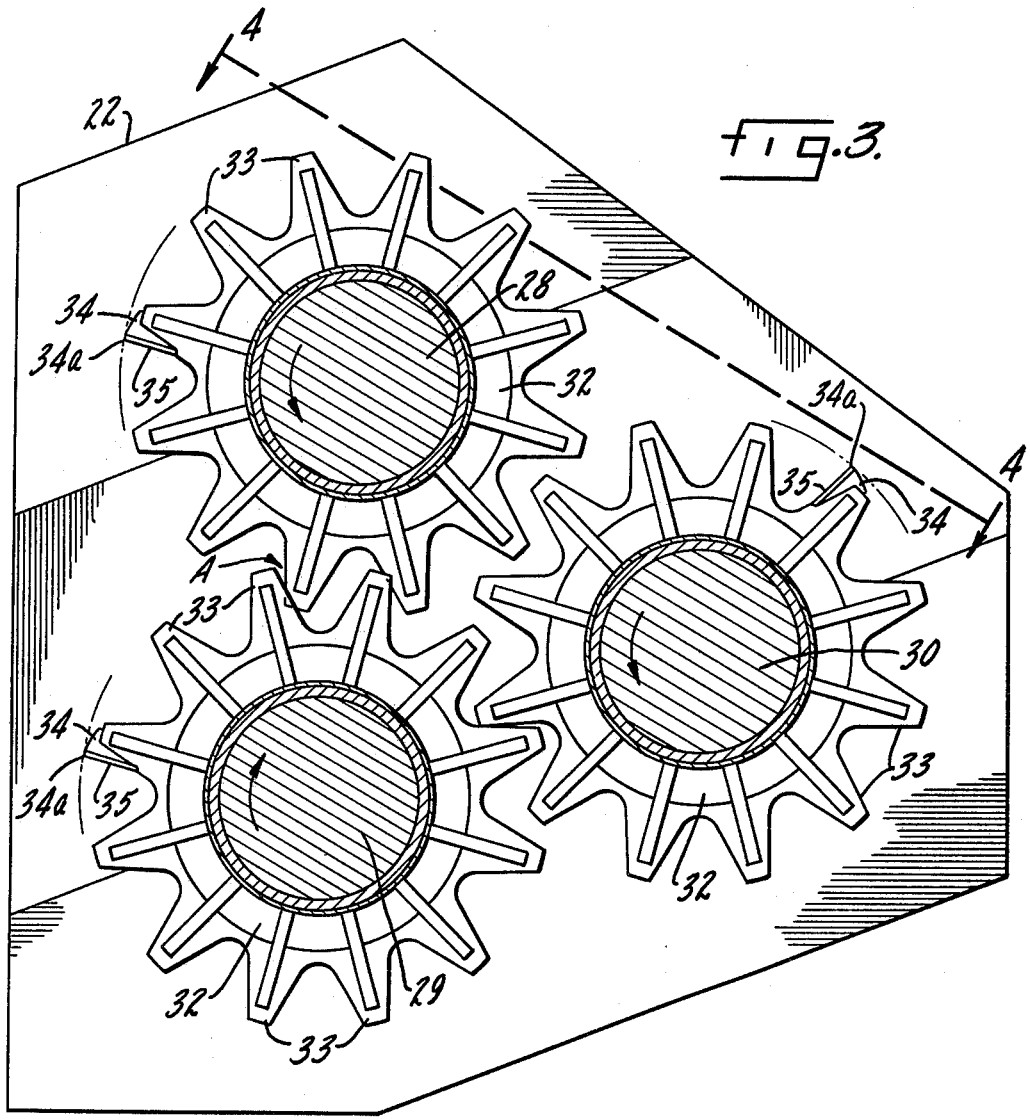

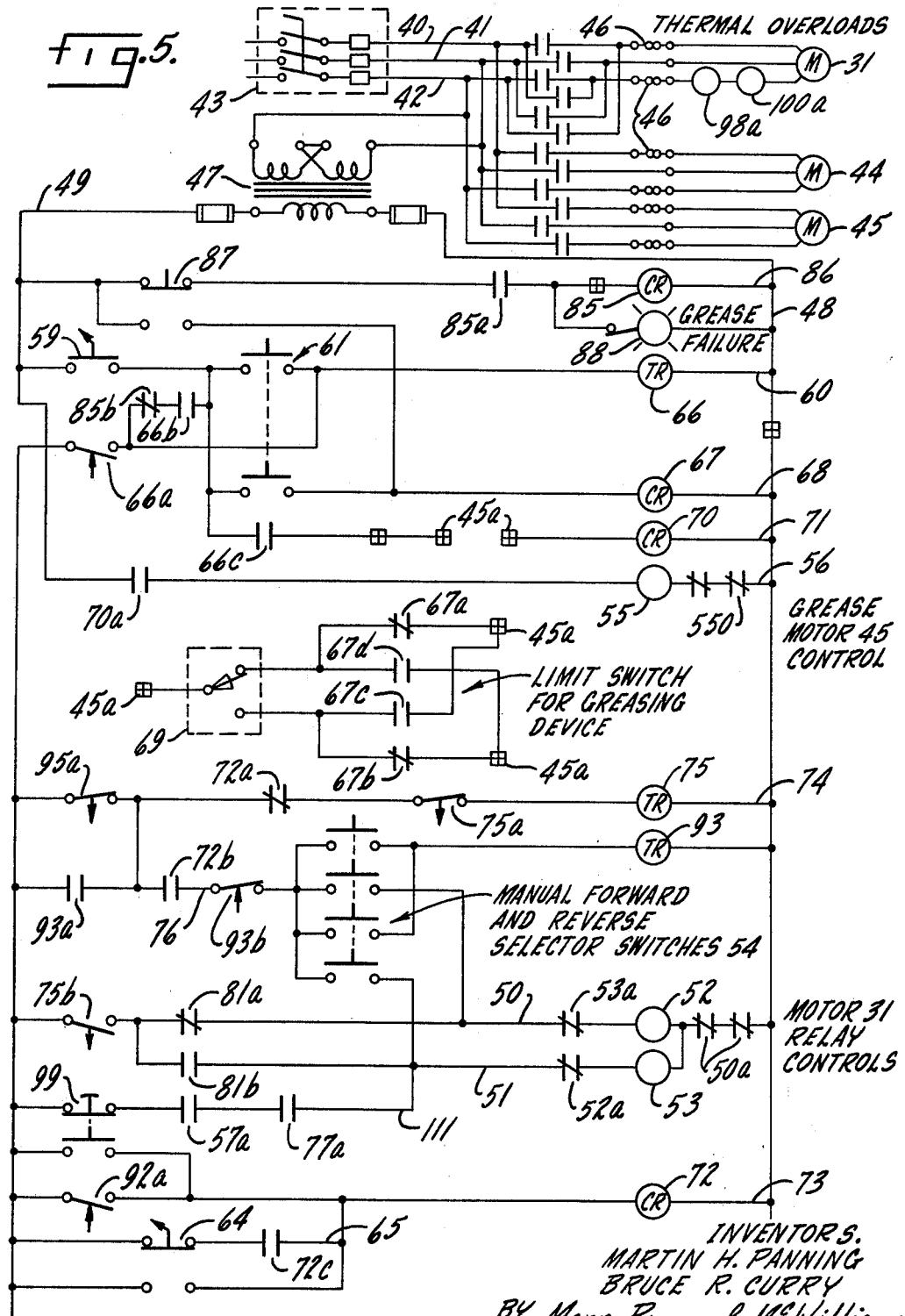

INVENTORS.
MARTIN H. PANNING
BRUCE R. CURRY
BY Mann, Brown & McWilliams
Attorneys.

United States Patent Office 3,502,276
Patented Mar. 24, 1970

3,502,276
SHREDDING MACHINE
Martin H. Panning, 304 Sunny Lane, Thiensville, Wis. 53092, and Bruce R. Curry, 4731 N. Oakland Ave., Whitefish Bay, Wis. 53217
Filed June 1, 1967, Ser. No. 642,967
Int. Cl. B02c 9/04, 15/08
U.S. Cl. 241—111                                    5 Claims

ABSTRACT OF THE DISCLOSURE

A shredding machine with shredding teeth arranged on plural axes and designed to operate with slow speed, high torque characteristics to enable the use of relatively small horsepower motors as compared to the load which is being shredded. The machine is arranged to handle extremely large objects of complex shapes and formed from various types of materials such as are represented in automobile bodies. An automatic control circuit protects against overloads.

---

The present invention is directed to new and useful improvements in shredding machines and is particularly concerned with improvements which enable economic shredding of large articles of complex shapes and varied materials, such as are represented in automobile bodies, for example.

The major purposes of the present invention are to so form and arrange a shredding machine for reducing relatively large objects into relatively small fragmentary portions thereof that problems of shock, abrasion, centrifugal forces, balance and weight are reduced while the overall arrangement of the machine permits use of economical shredding of material by the machine, these and other purposes of the invention being more apparent in the course of the ensuing specification and claims, when taken with the accompanying drawings, in which:

FIGURE 3 is an enlarged detail view illustrating the shredder elements utilized in the shredder of FIGURES 1 and 2;

FIGURE 5 is a circuit diagram of a motor control circuit utilized with the invention;

Like elements are designated by like characters throughout the specification and drawings.

Figure 1:
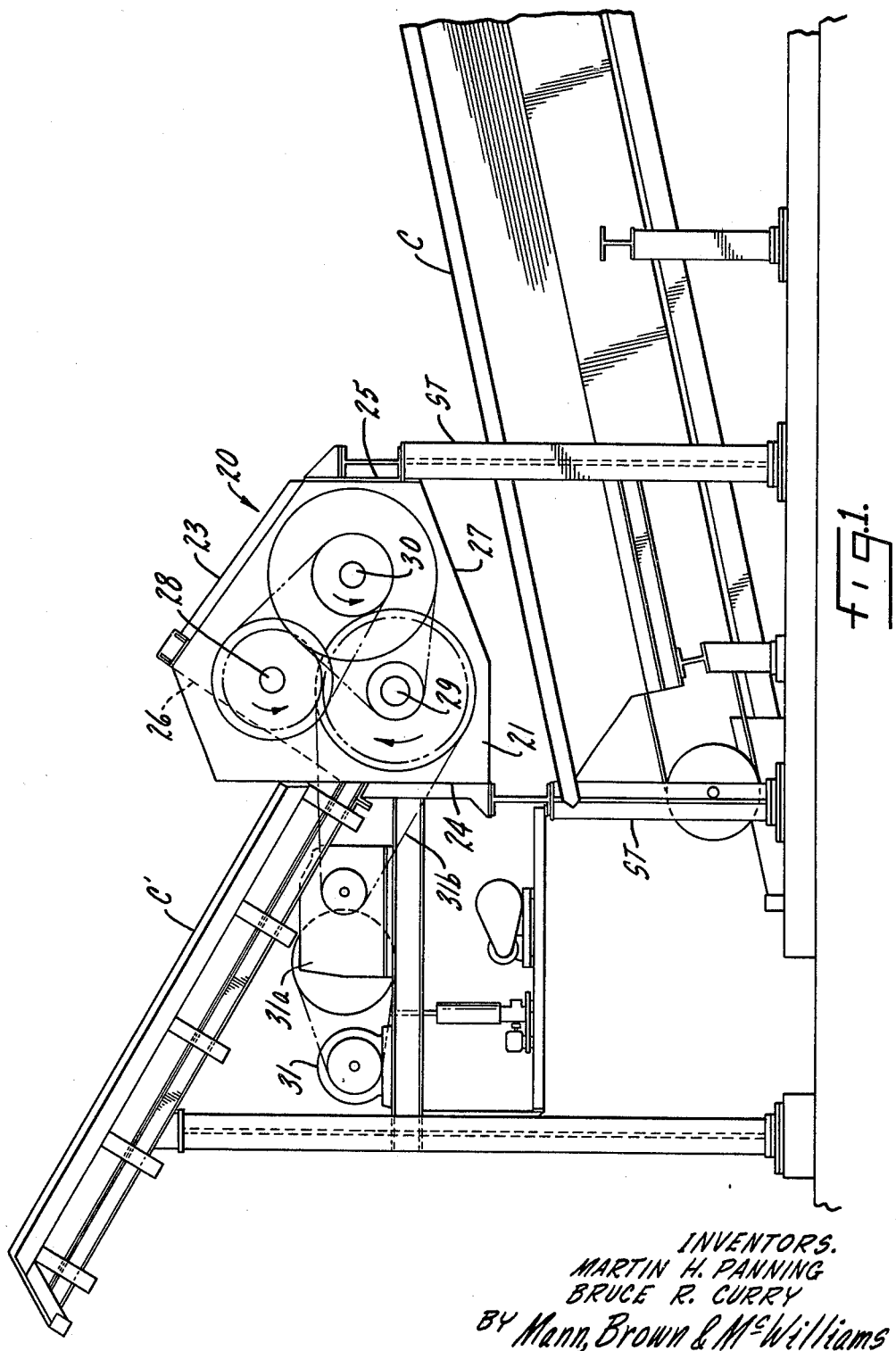
FIGURE 1 is a side elevational view of a typical shredder embodying the principles of the present invention.

With specific reference now to the drawings and in the first instance to FIGURE 1, the numeral 20 generally designates the frame of a shredding machine. The frame includes upstanding side walls 21 and 22, a top wall 23 and front and rear walls 24 and 25, respectively. The walls are arranged to provide an inlet opening as designated at 26 and a discharge opening at the lower portion of the frame as represented at 27. The frame of the machine, as illustrated in FIGURE 1, may be mounted on stilts ST so that the discharge from opening 27 may fall below the frame to an area where the comminuted material is carried away from the machine. A suitable conveyor C may be utilized beneath the discharge opening to carry comminuted material to some other point for further processing. A conveyor or a chute such as C' may be used to feed material to the inlet opening 26. The side walls 21 and 22 of the frame are preferably formed in plural superimposed sections as illustrated by sections 21a, 21b and 21c. Each section is formed with top and bottom laterally extending flanges 21d. Reinforcing flanges 21e extend between the top and bottom flanges to divide each section into generally equal areas. The flanges 21d of adjacent sections are formed with mating half bearings 21f for power shafts. Each of the sides 21 and 22 is formed in the same manner and may be formed from cast iron, cast steel, or weldments. The sections are connected by bolting the sections together. The split bearings 21f are used to journal three shafts 28, 29 and 30 which are arranged generally parallel to one another and with the axes of the shafts disposed horizontally and in a generally triangular fashion as is indicated in FIGURES 1, 2, 4 and 5. An electric motor 31 is positioned at the front of the frame and serves to rotate the shafts in the directions indicated. A suitable reducing means such as is represented by the gear reducer box 31a and the chain drive 31b serves to rotate the shafts. The chain drive 31b engages sprockets carried by the shafts exterior to the side walls. One shaft 28 is opposed to the central area of the inlet opening while another shaft 29 is positioned below and slightly forwardly of shaft 28. Shaft 30 is behind shafts 28 and 29.

Figure 2:
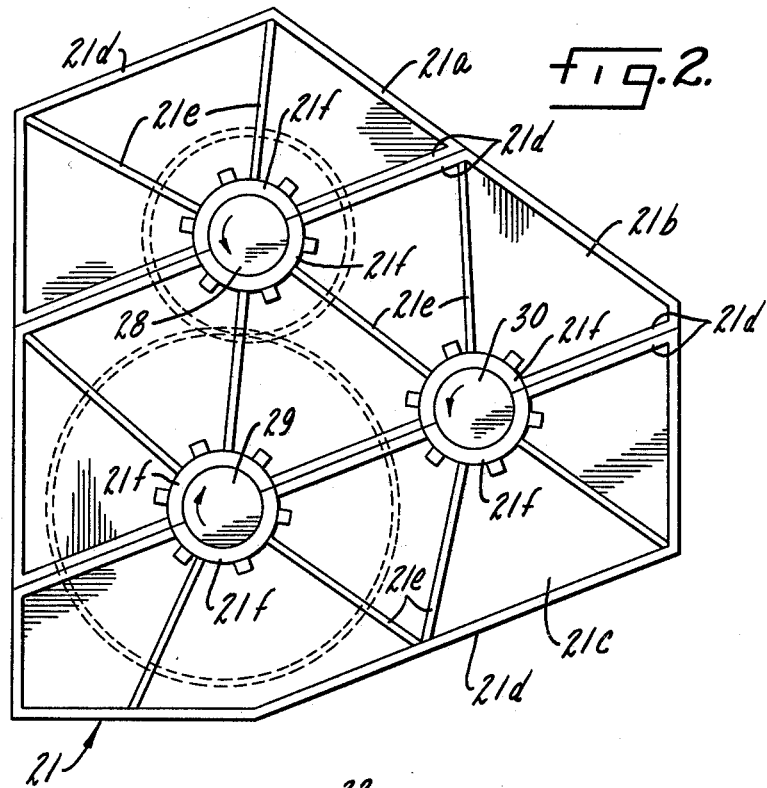
FIGURE 2 is a side view of the shredder illustrated in FIGURE 1 and particularly illustrating one of the two side frame sections for the shredder.

The shafts are preferably driven at speeds such that the shaft 28 adjacent to and nearest the inlet opening is driven in a counterclockwise direction as viewed in FIGURES 1, 2 and 5, and at a speed faster than the shaft 29 which is driven in a clockwise direction as viewed in FIGURES 2 and 5, but at a speed slower than the shaft 30. The shaft 30 which is farthest removed from the inlet opening is driven in the same direction as the shaft 28. Shaft 30 is positioned with its axis above the axis of shaft 29 but below the axis of shaft 28.

Each of the shafts 28, 29 and 30 carries disc-like elements or wheels thereon, which elements 32 carry radially extending shredding teeth 33. The teeth on each of the disc-like elements are identically formed and include extensions 34 fixed thereto. These extensions include a point 34a to pierce metal material. The teeth and extensions have a somewhat pyramidal-like shape to allow material punctured by the teeth to fall off or become dislodged from each particular tooth. The teeth have relatively sharp leading edges as designated at 35 to facilitate tearing and shearing of material, and the upper portions of the teeth extensions are formed at a slight inclination with respect to the radially extending axis of the teeth to facilitate a cutting and tearing action. This angle should be relatively slight so that material does not hang onto the teeth. The teeth extensions 34 are preferably made from a tough, wear-resistant steel. The extensions 34 may be welded to the basic tooth structures 33. Only one extension 34 is illustrated on each wheel in FIGURE 3. It should be understood that each of the twelve equally spaced teeth on each shaft in FIGURE 3 has such extensions. The tooth extensions may be omitted on certain of the wheel-like structures, as, for example, the outboard structures 32 at each side of shaft 30 in FIGURE 4.

Figure 4:
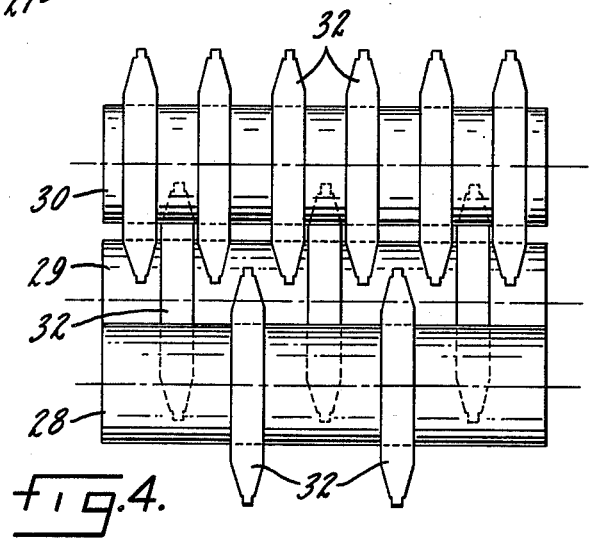
FIGURE 4 is a sectional view on a reduced scale of the shredder of FIGURE 3 looking in the direction of the arrows 4—4 of FIGURE 3.

The teeth and wheels or discs are preferably arranged on the shafts 28, 29 and 30 so that the uppermost shaft 28 carries a pair of wheels which are positioned so that they bisect the space between at least three equidistantly spaced wheels with teeth on the slow speed lower shaft 29. This is illustrated in FIGURE 4. The toothed wheels of the high speed shaft 30 are arranged so that at least four wheels are equidistantly spaced along the axis of shaft 30 and positioned so the wheels of shaft 29 each bisect the spaces between different pairs of wheels 32 on the shaft 30. The wheels 32 of shaft 28 are arranged to bisect the spaces between the adjoining pairs of wheels on shaft 30 bisected by the wheels 32 of shaft 29. This is illustrated in FIGURE 4.

The shafts and the teeth are so arranged that the teeth on the wheels of each of the shafts overlap the area traversed by the teeth of the other two shafts when viewing the machine from the side as appears in FIGURE 3. In some cases the number of teeth on the wheels of each shaft may be varied from the twelve illustrated. Also the different shafts may have different numbers of teeth on the wheels thereof. The number of teeth used should be such that the number of teeth on the high speed shaft which pass one tooth on the slow speed shaft in the annular area of overlap of the teeth is greater than the number of teeth of the medium speed shaft passing a tooth on the slow speed shaft in the annular area of overlap. It is preferable that the teeth on each of the shafts be arranged in a more or less spiral relation along the length of each shaft. For example, the teeth on shaft 29 are arranged so that the teeth of one wheel are not longitudinally aligned with the teeth on the other wheel of shaft 29 but instead are spaced circumferentially from one another. The teeth on the high speed shaft 30, for example, are arranged so that the teeth are more or less staggered from one end of the shaft to the other.

The machine is operated at relatively low speeds to produce high torque forces in the teeth 33 of the wheels. For example, slow speed shaft 29 may be operated at a speed of 1.77 r.p.m. while the medium speed shaft 28 is operated at a speed of 3.0 r.p.m., and high speed shaft 30 is operated at a speed of approximately 5.25 r.p.m. This speed gives a peripheral speed of the tips of the teeth on shaft 29 of approximately 28 feet per minute when the diameter across the tips is approximately five feet. It is preferred to operate the machine at a speed which is equal to or less than approximately 80 feet per minute in terms of the peripheral speed of the tips of the teeth of shaft 29, while the tips of the teeth of the other shafts are rotated or moved in the proportions stated. When operated this way, one tooth of the slow speed shaft 29 engaged with material between it and the teeth of the medium speed shaft 28 will be passed by approximately two teeth of the medium speed shaft 28 at the annular area designated at A where the teeth of the slow speed shaft and medium speed shaft overlap, and during passage of the tooth of the slow speed shaft 29 into and out of this area. Similarly, a tooth of the slow speed shaft 29 moving through the area of overlap with the teeth of the high speed shaft 30 will be passed by a plurality of teeth of the high speed shaft during the course of the movement of the tip of the tooth on the slow speed shaft through the annular area of overlap with the teeth of the high speed shaft. This slow operating speed minimizes shock on the teeth when the teeth encounter the material to be shredded and minimizes abrasive forces created by higher speeds. Also, the relatively slow speeds minimize problems with centrifugal force and balance problems in the machine.

Figure 6:
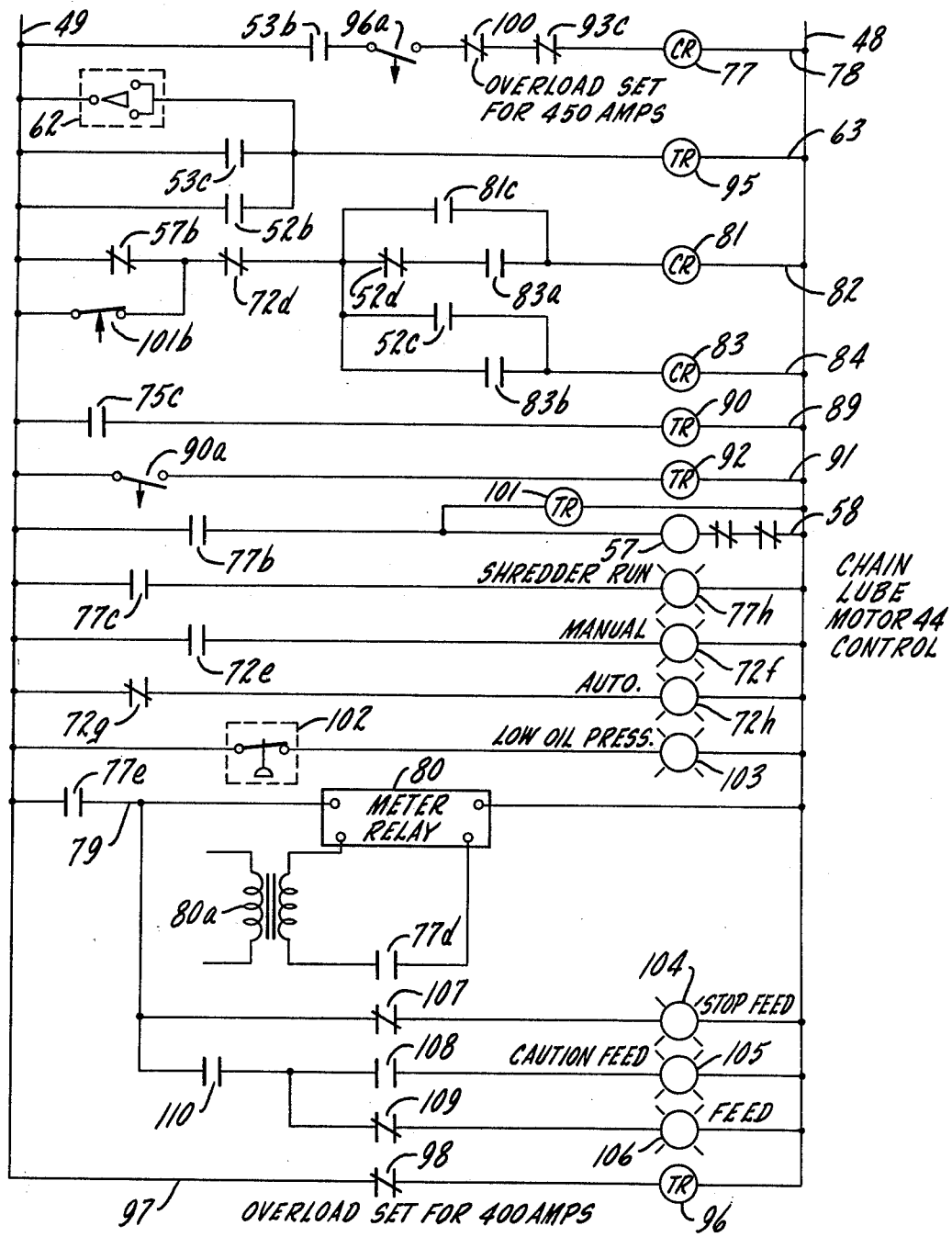
FIGURE 6 is a wiring diagram of a control circuit utilized in the invention, which control circuit is a part of and connected to the control circuit illustrated in FIGURE 5.

The control system for the shredder is illustrated in FIGURES 5 and 6. It should be understood that a single system is illustrated in the two FIGURES 5 and 6. As illustrated, drive motor 31 is adapted to be connected to a three-phase source of power indicated by the power lines 40, 41 and 42. A fused disconnect system 43 may be provided in the line leading to the motor 31. Motor 31 is a three-phase alternating current motor provided with relay operated contacts for operating the motor in reverse directions. Since such contacts for such motors are known to the art, they are not illustrated in the drawings. A second motor 44 is connected across the three-phase power supply and is adapted to drive a lubricating system for the chain drive between motor 31 and the power shafts 28, 29 and 30. The chain lubricating system driven by motor 44 is a conventional system and hence it is not illustrated in the drawings. A third motor 45 is connected across the three-phase power supply and is adapted to drive a greasing system for the power shafts 28, 29 and 30. This greasing system driven by motor 45 is a conventional system and hence is not illustrated in the drawings. Thermal overload devices 46 are in the power supply lines for the motors 31, 44 and 45 so as to cut off the power supply in the event of a thermal overload on the motors.

In order to control the operation of the motors 31, 44 and 45, a control circuit is supplied with power from two of the three-phase lines as by step-down transformer 47. The control circuit includes two main lines 48 and 49 leading from the transformer.

A pair of main motor control lines 50 and 51 are in parallel with one another across lines 48 and 49 for purposes of energizing a relay 52 which operates the contacts of motor 31 for operating the motor in a reverse direction, and a relay 53 which, when energized, operates the contacts for motor 31 to operate it in a forward direction, all under the control of other components in the circuit. Overload switches 50a may be connected between line 48 and relays 52 and 53. A rotatable selector switch, generally designated at 54, is adapted to allow manual operation for purposes of energizing either relay 52 or relay 53, as will be pointed out hereinafter.

Coil 55 is in a line 56 across lines 48 and 49 so that, when this coil is energized, grease system motor 45 is operated. Coil 55 is the starter coil for motor 45. Another starter coil 57 is in a line 58 across lines 48 and 49 so that, when this coil is energized, the chain lubricating system motor 44 is energized.

A main on and off switch 59 is in another line 60 across power lines 48 and 49, and a push button starting switch 61 is also in this line. The entire control circuit illustrated in FIGURES 5 and 6 is subject to the closure of the main on-off switch 59.

A centrifugal switch 62 is included in a line 63 across power lines 48 and 49, and this switch is adapted to be closed whenever motor 31 is stopped. Another control switch 64, in the form of a rotatable selector switch, is in a line 65 for purposes of enabling automatic operation of the system, as will be pointed out.

The system includes a number of switches controlled by the main motor relays 52 and 53 as well as certain other control relays and timing relays which will be described. The switches controlled by the control relays are illustrated in the drawings as normally closed or normally open. The normally closed switches are opened when the control relay associated therewith is energized, whereas the normally open switches are closed when the control relay associated therewith is energized. Three types of switches are associated with the timing relays which will be described. One type of switch is instantly actuated whenever the timing relay associated therewith is energized. This type of a switch is represented in the drawings as including both normally open and normally closed switches. The normally closed switches are instantly opened when the timing relay associated therewith is first energized, whereas a normally open switch is closed instantly whenever the timing relay associated therewith is energized. Another type of switch operated by the timing relays is an on delay type which is actuated only after a predetermined time delay following energization of the timing relay associated therewith. Both normally open and normally closed switches are adapted to be activated by the timing relays in this manner. This latter type of switch is represented as illustrated by the normally open timing relay switch associated with timing relay 66 in line 60 and designated at 66a in a line which connects with line 60. Timing relay 66 is energized whenever switches 59 and 61 are closed. When it is energized, it immediately closes switch 66b which holds relay 66 in, closes switch 66c, and, after a predetermined time delay, on the order of 10 seconds for example, closes switch 66a. This type of switch is represented by arrows which point toward the top of the drawings.

A third type of switch associated with the timing relays is an "off" delay type represented with arrows which point toward the bottom of the page. This type of switch is immediately actuated when the relay associated therewith is energized and then returns to the normal position illustrated in the drawings, after a predetermined time delay following deenergization of its associated relay.

After closure of the main switch 59 and start switch 61, a control relay 67 in line 68 across lines 48 and 49 is closed which immediately opens switches 67a and 67b while closing switches 67c and 67d in a limit circuit for the greasing motor 45. This circuit may be appropriately connected to terminals of the grease unit, which are indicated at 45a. A limit switch 69 in this circuit may be pressure-operated so as to be opened after pressure in the greasing system reaches a predetermined desired level.

Another control relay 70 is in a line 71 in parallel with line 68 and this relay is enerized by switch 66c whenever relay 66 is energized and the proper signal is received from greasing unit 45a. Relay 70, when energized, closes switch 70a in line 56 which in turn energizes the starter coil 55 for the motor of the greasing system. Overload switch 55o may be interconnected with the starter coil 55 so as to protect the same. When switch 69 opens. it breaks the circuit to relay 70 which opens switch 70a and stops grease motor 45.

Another control relay 72 is in a line 73 across power lines 48 and 49 and this relay, when energized, opens a switch 72a in a line 74 which supplies another "off delay" timing relay 75. It also closes switch 72b in one line 76 leading to manual selector switch 54 and switch 72c in the line 65 which includes the automatic reset switch 64. It opens a switch 72d in a line 82 which will be explained. Energization of this relay 72 also closes a switch 72e in a line supplying the pilot light 72f designating "manual" operation. Relay 72 also opens a switch 72g which, when closed, energizes another pilot light 72h which indicates automatic operation.

Control relay 77 is in a line 78 across power lines 48 and 49, and this relay, when energized, closes switch 77a in a circuit leading to selector switch 54 and switch 77b in line 58 leading to the starting coil 57 for the chain lubricating motor 44. It also closes switch 77c which, when closed, energizes a pilot light 77h which indicates a running condition of the shredder, and a switch 77e which is in a line 79 which supplies a current responsive relay control 80.

Relay control 80 includes two relays. One is energized when power is on line 79 and controls certain switches to be described. Another relay senses current values drawn by main motor 31 as by means of a step down transformer 80a which is connected to the motor 31 power lines. Another control relay 81, when energized, opens switch 81a in the line to relay 52 which controls the reverse operation of motor 31 and closes switch 81b which is in the line 51 supplying the relay 53 which controls the forward operation of the motor 31. Energization of relay 81 also closes switch 81c in a holding circuit for relay 81. Control relay 83 is in parallel with control relay 81 as through line 84, and energization of this relay closes switch 83a and 83b in the lines 82 and 84, respectively, and leading to relays 81 and 83. Control relay 85 is in a line 86 across lines 48 and 49, which line bypasses on-off switch 59. Line 86 has a manually operated switch 87, and energization of relay 85 closes switch 85a in line 86 to indicate grease failure. A pilot light 88 is placed across control relay 85 and is under control of switch 85a and switch 87.

"Off delay" timing relay 75, when energized, opens immediately normally closed switch 75a in the line 74 supplying relay 75, and switch 75a closes again after a predetermined time interval which may be on the order of several seconds. It also closes immediately normally open switch 75b which then supplies power to either lines 50 or 51 and motor control relays 52 and 53. Switch 75b opens again after the predetermined time interval. Energization of timing relay 75 also instantaneously closes switch 75c in a line 89, and closure of switch 75c then energizes another "off delay" timing relay 90. Timing relay 90 instantaneously closes a normally open switch 90a in line 91 which in turn energizes another "on delay" timing relay 92. After predetermined time delay, which may be 45 seconds, switch 90a opens. Energization of "on delay" timing relay 92, after a predetermined time interval, which may be on the order of 1½ minutes, closes switch 92a in the line 73 which may energize relay 72. Another "on delay" timing relay 93 is in the line to selector switch 54 and is adapted to provide a predetermined time delay on the order of several seconds, immediately closes switch 93a in the line leading through switch 72b to selector switch 54, and, after a predetermined time delay of several seconds, opens switch 93b in this same line. It also immediately opens switch 93c in the line 78 which energizes relay 77. Another "off delay" timing relay 95 is energized by line 63 leading to centrifugal switch 62, and this relay, when energized, instantaneously opens normally closed switch 95a in the line leading to switch 72a and timing relay 75, and, after a predetermined time delay after deenergization which may be on the order of 5 seconds, again closes switch 95a.

Another "off delay" timing relay 96 (lower part of FIGURE 6) is in a line 97 across the power lines 48 and 49 and, when energized, immediately closes switch 96a in the line supplying relay 77. After a predetermined interval of time following deenergization of timing relay 96, switch 96a again opens. Line 97 is under control of a normally closed switch 98 which is under control of a relay 98a in the main motor line 46. Relay 98a may be in a line leading from a step down transformer connected to the main motor line. Relay 98a is energized to open switch 98 whenever the current drawn by motor 31 exceeds a predetermined value which, in the case of a 200 horse power motor which is adequate for the size of machine herein described, may be on the order of 400 amperes. Opening of the switch 98 is accompanied by a delayed opening of switch 96a which in turn deenergizes control relay 77 and opens switch 77a in one of the lines supplying the motor forward operating coil 53.

The circuit also includes switches which are operated by the motor operating coils 52 and 53. For example, line 50 leading to the reverse coil 52 has a switch 53a which is opened whenever relay 53 is energized. Similarly line 51 leading to the forward coil 53 of the motor includes a switch 52a which is opened whenever the reverse relay 52 is energized. The switches 53a and 52a thus insure that only one or the other of the coils 52 and 53 is energized at one time. Motor relay 53 when energized also closes switch 53b in the line leading to control relay 77. It also closes switch 53c in the line 63 leading to timing relay 95. The relay 52 when energized closes the switch 52b which is in parallel with switch 53c for supplying line 63 and timing relay 95. Energization of relay 52 also closes switch 52c which bypasses switch 83b for supplying relay 83, and it opens switch 52d in the line supplying switch 83a and leading to control relay 81.

The chain lubricating starting coil 57 when energized closes switch 57a in the line containing switch 77a and also including a manually operated stop switch 99. This motor coil 57 also opens switch 57b in the line 82 leading to relay 81.

Normally closed overload switch 100 is in the line between switches 96a and 93c and may be operated by a current responsive relay 100a in the line leading to motor 31 so that this switch opens to disable control relay 77 whenever the current drawn by motor 31 exceeds a predetermined overload value which, for example, may be 450 amperes. In lieu of being directly in the motor 31 power line, relay 100a may be operated by a step down transformer while still sensing motor load values. This value is greater than the overload which operates relay 98a and which opens switch 96a. An "on delay" timing relay 101 is connected to line 58 across the chain lubricating motor relay so as to be energized when switch 77b is closed. It opens switch 101b after a predetermined time after being energized. Switch 101b bypasses switch 57b to supply relay 81. A pressure responsive switch 102 may be placed across the line so as to light a pilot light 103 whenever the pressure in the chain oiling system reaches a predetermined low value.

A series of pilot lights 104, 105 and 106 may be operated by switches 107, 108, 109 and 110, which switches in turn are controlled by the current meter relay control 80. One relay of control 80, for example, is energized whenever line 79 is energized to close switch 110 and open switch 107. Switch 107 then deenergizes light 104. Switch 107 is closed whenever the current drawn by drive motor 31 is at a predetermined maximum. The first relay is deenergized and switch 107 is then closed, while switch 110 is closed whenever the current reaches a higher and excessive value above normal. This energizes light 104 to indicate "stop feed." The other relay is energized when the current drawn by the motor reaches a predetermined low amount above normal. At the low value, this relay closes switch 108 and opens switch 109. When current is reduced, switch 110 again closes and switch 107 opens, which in turn energizes pilot light 105 to indicate a caution feed if the current is above the predetermined low value. When the current is at a proper level, light 106 is energized by closure of switch 109 to indicate normal operation and feeding should be continued.

The sequence of circuit operation is as follows: The main on-off switch 59 is closed and selector switch 64 is set to the automatic position to close line 65. The start switch 61 is then closed, which in turn energizes timing relay 66, and control relay 67. This opens switch contacts 67a and 67b of the greasing system, and closes contacts 67c and 67d. Control relay 70 is then energized through 66c and 45a (greasing unit). Switch 70a is then closed, which energizes the operating coil 55 for motor 45 of the greasing system. The timing relay 66 delays closure of switch 66a for an interval of time which may be on the order of 10 seconds until the greasing operation has been accomplished. Pressure responsive switch 69 of the greasing system will terminate operation of the greasing motor when the pressure is at a predetermined proper level by deenergizing relay 70. After the delay provided by timing relay 66, switch 66a which makes and breaks line 49 and consequent power to the rest of the control system, is closed which then allows power to be supplied to timing relay 75. Timing relay 75 immediately closes switch 75b which in turn energizes the reverse control relay 52 for the motor 31 thereby to operate the shredder motor 31 in the reverse direction. After a suitable delay switch 75b opens, removing the starting pulse and motor 31 stops. Energization of motor relay 52 closes switch 52c so as to energize control relay 83 while closing switches 83a and 83b which in turn energizes control relay 81. Energization of control relay 81 then closes switch 81b to set up the forward relay control of the drive motor 31 while opening switch 81a to isolate the reverse motor control relay 52. After the reverse movement and with forward switch 81b closed, the momentary high value of starting current during forward movement will keep relay 77 deenergized, which keeps switch 101b closed to energize relay 81. In other words, relay 81 stays energized for a long enough time atfer the reverse movement due to the delayed opening of switch 101b to get the coil 53 energized through switch 77a. After this interval of reverse operation, switch 75a again closes and relay 75 is again energized which immediately closes switch 75b to supply a starting pulse to coil 53. During the starting interval, the current draw is higher than normal so that the relay 77 is deenergized until it reduces. Relay 77 closes switch 77b thereby to energize the chain oiling motor 57. When the oil pressure builds up, switch 102 opens and the low oil pressure light 103 is deenergized. Relay 77 when energized also energizes pilot light 77e to indicate a shredder running condition and closes switch 77d of the current meter control 80. Timing relay 95 is energized when either the relay 52 or 53 is energized but it delays closing of switch 95a for the line leading to relay 75 for a period of approximately 15 seconds after deenergization of relay 52 or 53 and after zero speed switch 62 opens due to the machine rotational speed having dropped below a set r.p.m. value. The meter relay 80 is energized by energization of control relay 77 which controls oil motor 57. The shredder will now be operating normally with motor 31 running in a forward direction and with the motor 57 of the lubricating system energized to provide proper lubrication for the system.

In the event of a moderate overload, as determined by overload switch 98, relay 96 is deenergized and, after a predetermined interval of time which may be on the order of several seconds, switch 96a is opened thereby to deenergize control relay 77 which in turn opens switch 77a and stops the motor. In the event of an instantaneous heavier overload, switch 100 immediately opens to deenergize control relay 77, open switch 77a, and stop the motor control relay 53. Relay 96 is set to provide a predetermined time interval before opening switch 96a so that the shredder will not stop in the event of a moderate overload of several seconds, which will not damage the machine. If the overload is less than the time interval, switch 98 closes when the momentary overload ceases, thereby to energize relay 96 and maintain switch 96a closed.

Upon either condition of overload which results in deenergization of relay 77, switch 77b is opened, which stops the chain lubricating motor 44. If lubricating motor 44 stops for any reason, this opens switch 57a in the main line to motor relay 53.

When the shredder comes to a stop, speed responsive switch 62 opens and deenergizes timing relay 95. This closes switch 95a after a time delay of approximately 15 seconds, which in turn energizes timing relay 75. The delay of switch 95a insures that the machine is stopped.

This results in the reverse operation of motor 31 as previously described, followed by the normal forward operation. As the shredder moves forwardly, if either overload condition is still present, relay 77 will again be de-energized and the motor 31 will again stop and the jogging reverse and then forward operation will be repeated.

It may be noted that each time timing relay 75 is energized, timing relay 90 is also energized. Upon energization of timing relay 90, switch 90a will close immediately and will open approximately 45 seconds after relay 90 is deenergized. Therefore, if timing relay 90 is reenergized again before switch 90a has timed open, switch 90a stays closed and the time delay becomes accumulative. If switch 90a is held closed continuously long enough for "on delay" timing relay 92 to time out, switch 92a will close energizing switch 72c which will switch operation from automatic to manual. After a time interval of approximately 1½ minutes, the timing relay 92 closes switch 92a which energizes control relay 72 which in turn opens switch 72a to take the timing relay 75 which initiates automatic operation out of the circuit while closing switch 72b leading to the manual forward and reverse selector switch 54. Switch 72c closes upon energization of relay 72 to lock relay 72 into the circuit. Since relay 75 is deenergized, relay 90 and relay 92 are then deenergized. Switch 72e closes to light the manual pilot light 72f and the shredder may then be jogged, either forward or reverse, by manually operating the selector switch to close the circuit for relay 53 through line 111 or the motor reverse relay through line 112. The manual operation may only occur for a few seconds in either direction since relay 93 opens the circuit to itself through switch 93b after a few seconds. After relay 72 is energized by timing relay 92, the shredder motor cannot be again started in automatic operation until switch 64 is opened to deenergize relay 72.

In the event that the overload condition is eliminated during several automatic forward and reverse operations, and before the time determined by timing relay 92 has passed, switch 90a will open to deenergize relay 92 and automatic operation will continue.

In the event of failure of the greasing system, control relay 85, which is operated by the greasing system, will close switch 85a and energize pilot light 88, indicating grease failure, and will also open switch 85b to deenergize the remainder of the circuit. When the cause of grease failure is determined, switch 87 may be operated to close line 87a to energize control relay 67.

In effect relay 75 and switch 75b provide a starting circuit to energize one or the other of the motor control forward and reverse circuits leading to motor operating coils 52 and 53. The starting circuit is automatically energized when the motor is stopped, as by closing of switch 95a and is automatically switched to start the machine in the opposite direction of rotation from the previous operation. Further the unit only jogs in reverse and runs continuously only in forward or the normal feeding direction.

Relay 81 and its switches 81a and 81b automatically condition the reverse motor control coil 52 circuit for initial operation by the starting circuit in response to either a stopped condition of the motor or an overloaded condition. Relay 81 and its switches then condition the forward operating motor control coil circuit for activation by the starting circuit in response to an absence of overload in motor 31 while the motor is operating in the reverse direction, and disable the circuit for the reverse motor coil 52 whereby, when the motor stops in the reverse direction, the starting circuit may energize forward motor coil 53 long enough for the holding circuit through switch 77a to continue energization of the forward motor coil.

Relay 81 is deenergized a few seconds after the motor has been running in the forward direction and this immediately conditions switch 81a for the reverse operation, but the reverse operation is delayed until overload or a stopped condition is encountered, since during normal running switch 75b is open and the forward coil 53 is energized through the holding circuit.

In operation, the machine is started which results in an initial movement counter to the movements illustrated in FIGURE 3. After a partial revolution of the slow speed shaft 29, the control circuit reverses the machine to cause movement of the shafts in the directions illustrated by the arrows in FIGURE 3. Material, such as is represented by automobiles with the motors and wheels removed are then fed through the inlet opening of the machine. Such materials have relatively complex shapes and are composed of many different forms of materials such as are represented by the steel stampings of the body, the glass in the windows, and upholstery, the springs in the upholstery, the electrical wiring in the body, the power shaft and the differential housing and gears, etc. As the material is fed inwardly, the teeth of the high speed shaft and the teeth of the slow speed shaft adjacent to the inlet opening will initially puncture the portion of the material exposed to these teeth and draw the material inwardly in an inward feeding direction toward the high speed shaft 30. Since the teeth of the medium speed shaft are moving faster than the teeth of the slow speed shaft, the teeth of the medium speed shaft move toward the teeth of the slow speed shaft, thus tending to bend and compress material between the points of initial puncture created by the teeth of these two shafts. As the movement continues, the teeth of the medium speed shaft pass the teeth of the slow speed shaft and commence a tearing action on the material. As the same time, material such as wires, springs, or elongated heavy objects may be broken by the cooperative action of the teeth. In effect, a tooth on a shaft moving slower than the tooth on an adjecent and higher speed shaft tends to hold material back while the faster moving teeth adjacent thereto compress, tear, crush and bend the material between the teeth. As the material passes the overlapping area between the slow speed shaft 29 and the medium speed shaft 28 the relative direction of movement of the medium speed shaft 28 and high speed shaft 30 tends to push the material downward toward the overlapping area of the teeth on the slow speed shaft 29 and the teeth on the high speed shaft 30. The material, as it reaches this point, is considerably reduced in size, and broken pieces then pass to the shafts 29 and 30. As the material passes through the overlapping areas of the teeth on the shafts 29 and 30, further reduction of the material takes place, as by the cooperative puncturing, crushing, bending and tearing action of the teeth on the wheels of the shafts 29 and 30. The material tends to flatten out and spread laterally as it passes the space between the shafts 28 and 29. This spreading is accommodated by the greater number of tooth supporting wheel structures on shaft 30.

FIGURES 7, 8, 9 and 10 are diagrammatic illustrations of the action of the shredding teeth as they cooperatively work on material engaged by the teeth. In FIGURES 7–10 two adjacent teeth on each of the two wheels 32 of the shaft 28 are represented by the small circles along the lines 28, whereas two adjacent teeth on each of the wheels 32 of the shaft 29 are represented by circles positioned along the lines 29. FIGURES 7, 8, 9 and 10 illustrate the progressive positions of the teeth during a partial revolution of the shafts. It should be understood that the cooperative action of the teeth on shafts 29 and 30 will be similar to the action depicted for the cooperative action illustrated in FIGURES 7–10, except that the teeth of the shaft 29 are much closer to the teeth of the shaft 30 than is the spacing between the teeth of the shafts 28 and 29. In actual practice the spacing between the teeth of the shafts 29 and 30 may be such that a clearance space on the order of 4½ inches exists as the teeth of these shafts pass one another in the area of overlap. The space between the teeth of the shafts 28 and 29 is considerably larger and may be on the order of 12 inches or so.

Figure 7:
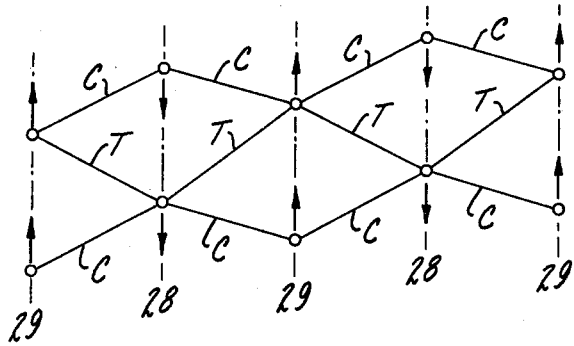
FIGURE 7 is a diagrammatic view illustrating the cooperative action of the shredding teeth on shafts 28 and 29.

FIGURE 7 represents the action of adjacent teeth on each of the wheels of the shafts 28 and 29 as they commence to engage material. The tips of the teeth may initially puncture, bend or crush material as they engage the material. The arrows indicate the direction of relative movement of the teeth on the shafts 28 and 29. For example, since the shaft 28 rotates faster than shaft 29, and since the material moving between the teeth moves at a speed slower than the peripheral speed of the shaft 28 but faster than the peripheral speed of the teeth on the shaft 29, the teeth of the shaft 28 will appear to move in one direction, for example downwardly in FIGURE 7, with respect to the material, while the teeth on shaft 29 appear to move in the opposite direction or upwardly in FIGURE 7. This relative movement creates compression lines and tension lines in the material between the teeth as is designated by the letters C and T, respectively. The letters C designate compression lines existing in the material as the teeth move closer to one another, whereas the letters T designate tension lines in the material as the teeth move away from one another.

Figure 8:
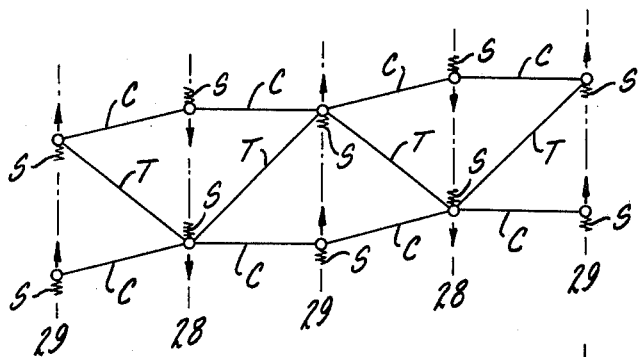
FIGURE 8 is a view similar to FIGURE 7 but illustrating a different progressive operative position of the shredding teeth.
Figure 9:
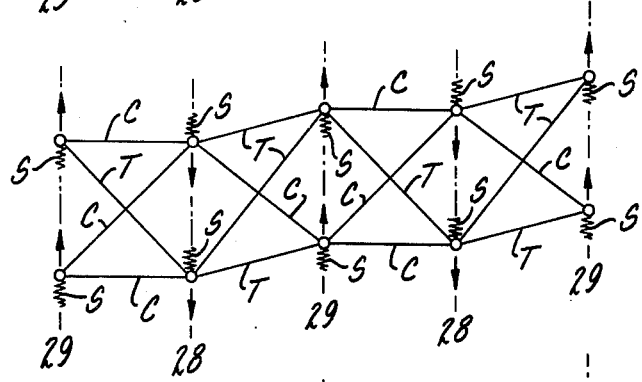
FIGURE 9 is a view similar to FIGURES 7 and 8 but illustrating a still different progressive operative position of the shredding teeth.

After initial engagement by the teeth, the cutting edges of the teeth tend to shear the material as designated by the letters S in FIGURE 8. The material is sheared in one direction by the teeth of the shaft 28, while it is sheared in the opposite direction by the teeth of the shaft 29. In some cases, of course, the material is not actually sheared but may be bent or moved instead of actually cutting or shearing but in the direction of the shear lines S indicated in FIGURE 8. In FIGURE 8 it may be noted that the compression lines have shortened while the tension lines have lengthened. In FIGURE 9 the degree of shear has increased due to further relative movement of the teeth with respect to the material and some of the tension lines have been lengthened and some of the material between some of the teeth has been placed in tension rather than compression since some of the teeth have moved to points where they are moving away from other teeth instead of moving towards them.

Figure 10:
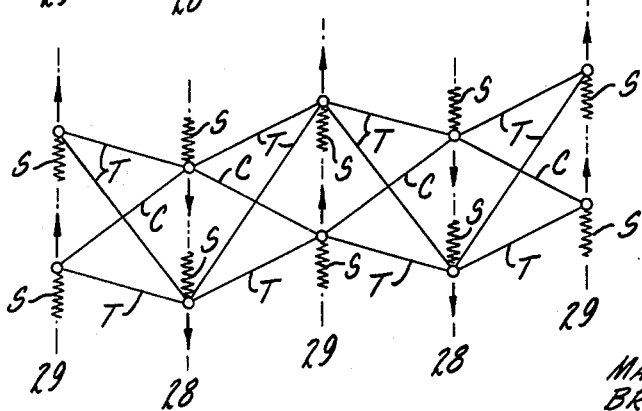
FIGURE 10 is a diagrammatic view similar to FIGURES 7, 8 and 9 but illustrating a still different progressive operative position of the shredding teeth.

FIGURE 10 illustrates a further progression with increased tension lines and compression lines as indicated. As the teeth move further relative to one another from the position indicated in FIGURE 10, the shear lines S will gradually increase so that they extend substantially completely between adjacent teeth on the same wheel.

The overall action is such as to puncture or bend the material at equally spaced points along each shaft while progressively shearing and bending at these equally spaced points and while subjecting the material between these points to both compressive and tension stresses. Compressive stresses tend to bend and break material while the tension stresses set up tend to elongate and tear the material. By reference to FIGURE 7 it may be seen that the general areas of material between the teeth of adjacent shafts are worked in both compression and tension upon initial engagement with the tension forces increasing as the teeth of shaft 28 move alongside and away from the teeth on shaft 29. The result is to subject the metal being shredded to such severe stresses that it is effectively broken into pieces that are of a size suitable for baling.

When overload occurs under the previously stated conditions, the machine will stop due to opening of switch 77a and the reverse and then forward cycle will commence. Reversing moves the material back toward the inlet and when the forward movement again commences, the material tends to realign itself which may result in removal of the overloaded condition.

The particular arrangement of the teeth along with the slow operating speeds and the protective control system for the shredder results in the use of relatively small motors and relatively lighter frame structures, than is the case where different arrangements and higher operating speeds are employed. For example, machines weighing approximately 80 tons as herein described and capable of reducing automobile bodies to relatively small pieces at the rate of one automobile a minute, may be operated with a drive motor 31 of approximately 200 horsepower.

The speed of movement of the article being shredded through the machine is approximately the average of the peripheral speeds of the teeth of the slow speed shaft 29 and the teeth of the medium speed shaft 28. Pieces of this material, of course, will move faster through the overlapping area between the teeth of the slow speed shaft 29 and the teeth of the high speed shaft 30 since passage through this area of overlap again will be close to the average of the two peripheral speeds of the teeth of these shafts.

The arrangement of the teeth provides essentially balanced end thrusts on the shafts which is important in terms of reducing bearing wear and in terms of economical construction of the machine.

Whereas we have shown and described an operative form of the invention, it should be understood that this showing and description thereof should be taken in an illustrative or diagrammatic sense only. There are modifications to the invention which will fall within the scope and spirit thereof and which will be apparent to those skilled in the art. The scope of the invention should be measured only by the scope of the hereinafter appended claims.

We claim:

1. A shredding machine including a frame having an inlet and an outlet, a pair of shafts opposed to said inlet and a third shaft spaced from said pair of shafts, the axes of said shafts extending generally parallel to one another and arranged in triangular fashion, said pair of shafts being positioned so that their axes lie in a common plane between said inlet and said third shaft, each shaft having a wheel-like structure thereon with a plurality of shredding teeth spaced circumferentially of the structure, said third shaft having a plurality of said wheel-like structures equally spaced along the axis thereof and one of said pair of shafts having at least one wheel-like structure positioned thereon, the other of said pair of shafts having at least a pair of wheel-like structures thereon, the teeth of said wheel-like structures on all of said shafts being in interfitting relation wherein the teeth of a wheel-like structure on each shaft overlap the teeth on another shaft, the wheel-like structures on said third shaft being spaced more closely to one another than the wheel-like structures on said other shaft, each wheel-like structure on said pair of shafts being spaced equidistantly from a pair of wheel-like structures on said laterally disposed shaft, and means for rotating all of said shafts at different speeds such as to cause feeding of material from said pair of shafts towards said third shaft and progressive shredding of material as it passes between shafts.

2. The structure of claim 1 wherein said one shaft has at least a pair of said wheel-like structures thereon.

3. The structure of claim 1 wherein said one shaft is adapted to be rotated at a speed faster than said other of said pair of shafts and said pair of shafts is adapted to be rotated in opposite directions, said one shaft being adapted to be rotated at a speed such that one tooth thereon, during passage through the annular area of overlap with the teeth of said other shaft, passes approximately two teeth of said other shaft.

4. The structure of claim 1 wherein the said one shaft is adapted to be rotated at a speed such that the tips of the teeth thereof move at a peripheral speed of less than eighty feet per minute.

5. The structure of claim 1 wherein said pair of shafts are adapted to be rotated in opposite directions such as to produce a feeding of material from said inlet toward said laterally spaced shaft and said laterally spaced shaft is adapted to be rotated in the same direction as the other shaft.

References Cited

UNITED STATES PATENTS

| | | | |
|---|---|---|---|
| 690,505 | 1/1902 | Wurster | 241—159 |
| 1,419,407 | 6/1922 | Pardee | 241—236 X |
| 2,894,697 | 7/1959 | Panning | 241—236 X |
| 3,089,409 | 5/1963 | Tretheway | 241—236 X |
| 3,167,261 | 1/1965 | Wonneberger | 241—159 |
| 3,396,914 | 8/1968 | Liebman | 241—236 X |

ROBERT C. RIORDON, Primary Examiner

D. G. KELLY, Assistant Examiner

U.S. Cl. X.R.

241—36, 117, 159, 236, 295